(12) United States Patent
Shizu et al.

(10) Patent No.: US 11,038,409 B2
(45) Date of Patent: Jun. 15, 2021

(54) ROTOR OF SYNCHRONOUS MOTOR

(71) Applicant: OKUMA Corporation, Aichi (JP)

(72) Inventors: Tatsuya Shizu, Aichi (JP); Takanori Yokochi, Aichi (JP)

(73) Assignee: OKUMA CORPORATION, Aichi (JP)

( * ) Notice: Subject to any disclaimer, the term of this patent is extended or adjusted under 35 U.S.C. 154(b) by 13 days.

(21) Appl. No.: 16/507,245

(22) Filed: Jul. 10, 2019

(65) Prior Publication Data

US 2020/0021177 A1    Jan. 16, 2020

(30) Foreign Application Priority Data

Jul. 13, 2018    (JP) ............................. JP2018-132900

(51) Int. Cl.
  *H02K 1/22* (2006.01)
  *H02K 1/27* (2006.01)
  *H02K 21/02* (2006.01)
  *H02K 1/02* (2006.01)

(52) U.S. Cl.
  CPC ............. *H02K 21/022* (2013.01); *H02K 1/02* (2013.01); *H02K 1/223* (2013.01); *H02K 1/276* (2013.01)

(58) Field of Classification Search
  CPC .. H02K 1/00; H02K 1/02; H02K 1/22; H02K 1/223; H02K 1/27; H02K 1/276; H02K 1/2766; H02K 21/00; H02K 21/02; H02K 21/022; H02K 21/14
  See application file for complete search history.

(56) References Cited

U.S. PATENT DOCUMENTS

| | | | | |
|---|---|---|---|---|
| 2006/0273678 A1* | 12/2006 | Futami | ................. | H02K 1/276 310/156.53 |
| 2010/0117477 A1* | 5/2010 | Yoshino | ................. | H02K 1/276 310/156.53 |
| 2012/0175989 A1* | 7/2012 | Mathoy | ................. | H02K 1/2766 310/156.53 |
| 2015/0280500 A1* | 10/2015 | Nigo | ................. | H02K 21/16 310/156.53 |
| 2016/0172913 A1* | 6/2016 | Baba | ................. | H02K 1/2766 417/410.3 |

FOREIGN PATENT DOCUMENTS

JP    08182267 A    12/1996

* cited by examiner

*Primary Examiner* — Tran N Nguyen
(74) *Attorney, Agent, or Firm* — Cantor Colburn LLP

(57) ABSTRACT

A rotor of a synchronous motor includes a rotor core that includes magnet insertion holes and a plurality of slits formed on an outer peripheral side of the magnet insertion holes, and permanent magnets embedded in the magnet insertion holes. Magnetic-path forming slits are formed at intervals in a direction along a side of the permanent magnet. Magnetic paths are formed between the magnetic-path forming slits and at portions on the outside of the magnetic-path forming slits on the outermost side. An adjusting slit is formed between a predetermined magnetic-path forming slit and the permanent magnet such that a difference between quantities of magnetic flux passing through the magnetic paths adjacent to each other for widths in a direction intersecting an orientation of a magnetic pole of the permanent magnet is small.

13 Claims, 4 Drawing Sheets

ROTOR OF SYNCHRONOUS MOTOR

CROSS REFERENCE TO RELATED APPLICATION

This application claims priority to Japanese Patent Application No. 2018-132900 filed on Jul. 13, 2018, which is incorporated herein by reference in its entirety including the specification, claims, drawings, and abstract.

TECHNICAL FIELD

The present disclosure relates to a rotor of a synchronous motor.

BACKGROUND

There are permanent magnet synchronous motors having various structures. A surface magnet synchronous motor (hereinafter, referred to as a "surface permanent magnet synchronous motor (SPM)") having permanent magnets attached to an outer peripheral surface of a rotor and an embedded magnet synchronous motor (hereinafter, referred to as an "interior permanent magnet synchronous motor (IPM)" or simply as "synchronous motor") having permanent magnets embedded in a rotor core are well known.

In comparison with the SPM having the permanent magnets attached to the surface of the rotor, since the IPM has the structure in which the permanent magnets are embedded in the rotor, there is a low risk that the permanent magnets scatter when the rotor rotates at a high speed. In the IPM, since it is not necessary to form curved surfaces for attaching the permanent magnets to the surface of the rotor on the permanent magnet as in the case of the SPM, flat permanent magnets can be adopted, and thus, it is possible to reduce cost.

Accordingly, it is possible to realize high reliability and low cost as long as it is possible to adopt the IPM as a servomotor for driving a feed shaft of a machine tool, for example. However, in general, since the IPM has an inductance larger than that of the SPM, there is a delay in current tracking, and thus, controllability is poor. Thus, the IPM is not suitable for a servomotor that requires a high-speed and high-accuracy positioning operation.

In this regard, the rotor disclosed in, for example, JP 08-182267 A is known as the rotor structure for reducing the inductance of the IPM. Hereinafter, the structure of the rotor will be described with reference to FIG. 5. FIG. 5 is a diagram illustrating an example of a cross section of a rotor in the IPM of the prior art. A rotor 50 includes a rotor core 51 formed by stacking silicon steel plates, and a plurality of permanent magnets 53. The rotor core 51 includes a plurality of magnet insertion holes 57 formed at intervals in a circumferential direction, and a plurality of slits 52 formed on an outer peripheral side of the magnet insertion holes 57. Each permanent magnet 53 is embedded in the respective magnet insertion hole 57, and an orientation of a magnetic pole is a radial direction of the rotor core 51. The rotor 50 is connected to a rotational shaft (not illustrated) in a center thereof. The magnet insertion holes 57 and the slits 52 are holes (cavities) opened in an axial direction of the rotational shaft (a direction penetrating through the paper). Magnetic paths 54 are formed between the slits 52 adjacent each to other and between the slits 52 and an outer peripheral end of the rotor core 51.

A stator (not illustrated) is disposed on the outside of the rotor 50 in the radial direction. The stator has a substantially cylindrical shape, and a plurality of pole teeth are arranged on a cylindrical inner peripheral surface along the circumferential direction. Spaces between the pole teeth are called slots. A winding is wound around the pole teeth while passing through the slots, and thus, a magnetic pole is formed.

FIG. 6 is a partial enlarged view of the rotor 50 of FIG. 5 and shows magnetic flux lines 55 generated from the permanent magnets 53 and a magnetic flux line 56 generated by applying a current to the stator winding. It can be seen from FIG. 6 that the slits 52 are arranged so as to prevent the passage of the magnetic flux line 56 generated by applying the current to the stator winding. An inductance of the IPM is reduced by arranging the slits 52 in this manner and reducing the magnetic flux line 56 generated by applying the current to the stator winding. Meanwhile, the permanent magnet 53 is magnetized in an outward orientation in the radial direction. The magnetic flux lines 55 generated from the permanent magnet 53 pass through the magnetic paths 54, and flow to the stator.

Here, attention is paid to a quantity of magnetic flux passing through a magnetic path 54a far from a center of the magnetic pole and a magnetic path 54b close to the center of the magnetic pole. In FIG. 6, the number of magnetic flux lines 55 indicates a relative quantity of magnetic flux. For the sake of convenience in description, widths of the magnetic path 54a and the magnetic path 54b (widths in a direction intersecting the orientation of the magnetic pole of the permanent magnet 53, widths in a left-right direction which is the direction along the side of the permanent magnet 53 in FIG. 6) are set so as to be equal. Thus, the same number (three) of magnetic flux lines flow to the magnetic path 54a and the magnetic path 54b from the permanent magnet 53. At the magnetic path 54b, three flowed magnetic flux lines flow to the state as they are. In contrast, since one magnetic flux line leaks to a connection portion between the magnetic poles at the magnetic path 54a, only two magnetic flux lines of the three flowed magnetic flux lines flow to the stator.

SUMMARY

As stated above, in the rotor of the IPM of the prior art, the magnetic flux lines generated from the permanent magnet 53 pass through the magnetic path 54b close to the center of the magnetic pole rather than the magnetic path 54a far from the center of the magnetic pole, and flow to the stator. Here, since the number of passed magnetic flux lines and a magnetic attraction force are approximately proportional to each other, a large magnetic attraction force is generated at the magnetic path through which the large number of magnetic flux lines pass, and only a small magnetic attraction force is generated at the magnetic path through which the small number of magnetic flux lines pass. As stated above, when the number of passed magnetic flux lines is different depending on the magnetic path, a difference between the magnetic attraction forces is generated depending on a rotational position of the rotor 50. That is, the magnetic attraction force becomes large when the magnetic path through which the large number of magnetic flux lines pass approaches pole teeth of the stator, whereas the magnetic attraction force becomes small when the magnetic path through which the small number of magnetic flux lines pass approaches the pole teeth of the stator. As stated above, when the magnetic attraction force fluctuates depending on the rotational position of the rotor 50, ripples of torque called cogging torque occur when the rotor 50 rotates.

For example, when a servomotor having large cogging torque is used for the feed shaft of the machine tool, there is a problem that streaks appear on a cut surface. An object of the present disclosure is to provide a rotor of a synchronous motor capable of reducing cogging torque.

The rotor of the synchronous motor of the present disclosure adopts the following means in order to achieve the aforementioned object.

A rotor of a synchronous motor of the present disclosure includes a rotor core that is formed by using a silicon steel plate or a soft magnetic material, the rotor core including a plurality of magnet insertion holes formed at intervals in a circumferential direction and a plurality of slits formed on an outer peripheral side of the magnet insertion holes, and a plurality of permanent magnets which are embedded in the magnet insertion holes, respectively, and whose orientation of a magnetic pole is a radial direction of the rotor core. The plurality of slits include an adjusting slit and magnetic-path forming slits formed at intervals in an intersecting direction which intersects the orientation of the magnetic pole of each permanent magnet, at least one of the magnetic-path forming slits is an adjusted slit, magnetic paths are formed between the magnetic-path forming slits and at portions on an outside of the magnetic-path forming slits on an outermost side in the intersecting direction, and the adjusting slit is formed between the adjusted slit and the permanent magnet such that a difference between quantities of magnetic flux passing through the magnetic paths adjacent to each other for widths in the intersecting direction is small.

In the rotor of a synchronous motor of the present disclosure, a maximum width of the adjusting slit in the intersecting direction may be larger than a maximum width of the adjusted slit in the intersecting direction.

In the rotor of a synchronous motor of the present disclosure, the adjusting slit may be connected to the magnet insertion hole.

In the rotor of a synchronous motor of the present disclosure, the adjusted slit may be the magnetic-path forming slit present so as to be close to a center of the magnetic pole of the permanent magnet.

In a rotor of a synchronous motor of the present disclosure, the intersecting direction may be a first direction along a side of the permanent magnet, and W1, which is a shortest distance between an outer peripheral end of the rotor core and an edge of the magnet insertion hole on a side of one end of the permanent magnet in the first direction, W2, which is a distance in the first direction and is a distance from the one end of the permanent magnet to an edge of the magnetic-path forming slit closest to the one end on the side of the one end, W3, which is a distance in the first direction and is a distance from an edge of the adjusted slit on the side of the one end to an edge of the magnetic-path forming slit adjacent to the adjusted slit on the side of the one end, which is close to the adjusted slit, and W4, which is a distance in the first direction and is a distance from an edge of the adjusting slit on the side of the one end to an edge of the magnetic-path forming slit adjacent to the adjusting slit on the side of the one end, which is close to the adjusting slit, may satisfy a relationship of Equation (1).

$$(W2-W1)/W2 = W4/W3 \tag{1}$$

In the rotor of a synchronous motor of the present disclosure, the magnetic-path forming slits present on both sides of the magnetic-path forming slit present so as to be close to the center of the magnetic pole of the permanent magnet may be used as the adjusted slit.

A rotor of a synchronous motor of the present disclosure includes a rotor core that is formed from a silicon steel plate or a soft magnetic material, the rotor core including a plurality of magnet insertion holes formed at intervals in a circumferential direction and a plurality of slits formed on an outer peripheral side of the magnet insertion holes, and a plurality of permanent magnets which are embedded in the magnet insertion holes, respectively, and whose orientation of a magnetic pole is a radial direction of the rotor core. The plurality of slits are formed at intervals in an intersecting direction which intersects the orientation of the magnetic pole of each permanent magnet, magnetic paths are formed between the slits and at portions on an outside of the slits on an outermost side in the intersecting direction, and two or more kinds of slits whose maximum widths in the intersecting direction are different are formed such that a difference between quantities of magnetic flux passing through the magnetic paths adjacent to each other for widths in the intersecting direction is small.

In the rotor of a synchronous motor of the present disclosure, at least one of the slits may be a deformation slit which extends from a side of the permanent magnet toward an outer peripheral side of the rotor core, and may have a shape in which a width in the intersecting direction changes.

In the rotor of a synchronous motor of the present disclosure, a width of an end portion of the deformation slit in the intersecting direction on the side of the permanent magnet may be larger than a width of an end portion of the deformation slit on the outer peripheral side of the rotor core in the intersecting direction.

In the rotor of a synchronous motor of the present disclosure, the deformation slit may be connected to the magnet insertion hole.

In the rotor of a synchronous motor of the present disclosure, the deformation slit may be the slit present so as to be close to the center of the magnetic pole of the permanent magnet.

In the rotor of a synchronous motor of the present disclosure, the intersecting direction may be a first direction along a side of the permanent magnet, an end portion of the deformation slit on the side of the permanent magnet may be an expansion portion, a portion between the end portion of the deformation slit on the side of the permanent magnet and the end portion on the outer peripheral side of the rotor core may be an intermediate portion, and W1, which is a shortest distance between an outer peripheral end of the rotor core and an edge of the magnet insertion hole on a side of one end of the permanent magnet in the first direction, W2, which is a distance in the first direction and is a distance from the one end of the permanent magnet to an edge of the slit closest to the one end on the side of the one end, W5, which is a distance in the first direction and is a distance from an edge of the intermediate portion of the deformation slit on the side of the one end to an edge of the slit adjacent to the deformation slit on the side of the one end, which is close to the deformation slit, and W6, which is a distance in the first direction and is a distance from an edge of the expansion portion of the deformation slit on the side of the one end to an edge of the slit adjacent to the deformation slit on the side of the one end, which is close to the deformation slit, may satisfy a relationship of Equation (2).

$$(W2-W1)/W2 = W6/W5 \tag{2}$$

In the rotor of a synchronous motor of the present disclosure, the slits present on both sides of the slit present so as to be close to the center of the magnetic pole of the permanent magnet may be used as the deformation slit.

According to the rotor of the synchronous motor of the present disclosure, it is possible to reduce cogging torque of the synchronous motor.

BRIEF DESCRIPTION OF DRAWINGS

Embodiment(s) of the present disclosure will be described based on the following figures, wherein.

DESCRIPTION OF EMBODIMENTS

Hereinafter, an embodiment of a rotor of a synchronous motor of the present disclosure will be described with reference to the drawings.

First Embodiment

Figure 1:
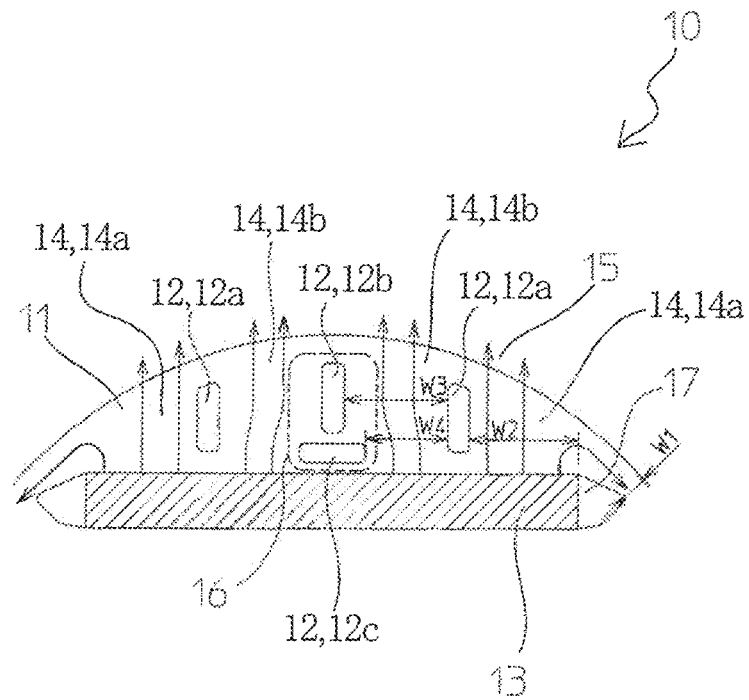
FIG. 1 is a partial enlarged view of a cross section of a rotor according to a first embodiment.

FIG. 1 is a partial enlarged view of a cross section of a rotor 10 of a synchronous motor according to a first embodiment. The rotor 10 of the synchronous motor of the present embodiment has the same configuration as that of the rotor 50 of the synchronous motor illustrated in FIG. 5 except for forms of slits. That is, referring to FIGS. 1 and 5, the rotor 10 includes a rotor core 11 (corresponding to a reference sign 51 of FIG. 5) formed by stacking silicon steel plates, and a plurality of permanent magnets 13 (corresponding to a reference sign 53 of FIG. 5). The rotor core 11 includes a plurality of magnet insertion holes 17 (corresponding to a reference sign 57 of FIG. 5) formed at intervals in a circumferential direction. Each permanent magnet 13 is embedded in a respective magnet insertion hole 17, and an orientation of a magnetic pole is a radial direction of the rotor core 11. The rotor 10 is connected to a rotational shaft (not illustrated) in a center thereof. The magnet insertion holes 17 and slits 12 to be described below are holes (cavities) opened in an axial direction of the rotational shaft (a direction penetrating through the paper).

Figure 5:
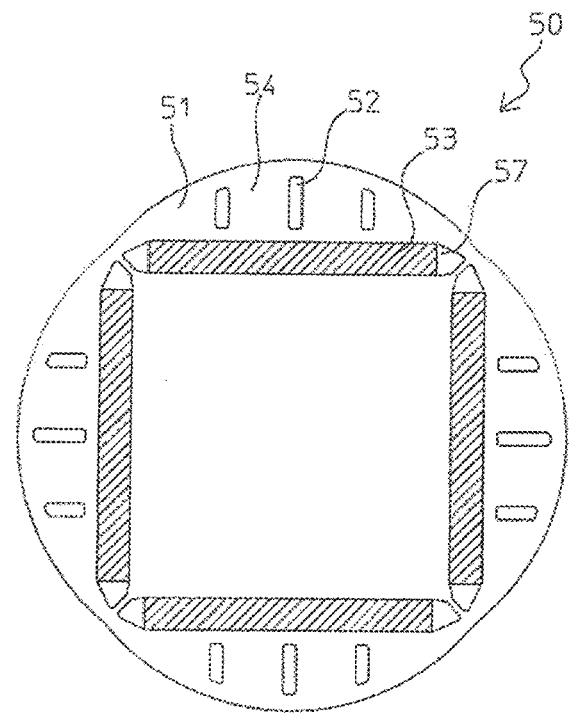
FIG. 5 is a diagram illustrating an example of a cross section of a rotor in an IPM of the prior art.

In the first embodiment and FIG. 5, both the number of magnet insertion holes 17 (corresponding to a reference sign 57 of FIG. 5) and the number of permanent magnets 13 (corresponding to a reference sign 53 of FIG. 5) are four. However, the number of magnet insertion holes and the number of permanent magnets may be optionally determined depending on the number of magnetic poles.

In the present specification, it should be noted that the circumferential direction of the rotor 10 or the rotor core 11 may not be a strict circumferential direction. For example, when the number of magnet insertion holes 57 (permanent magnets 53) adjacent to each other at 90 degrees as illustrated in FIG. 5 is two, even though the magnet insertion holes 57 (permanent magnets 53) are arranged so as to face each other up and down or left and right in FIG. 5, it is represented that the magnet insertion holes 57 (permanent magnets 53) are arranged (formed) at intervals in the circumferential direction. And, for example, when the number of magnet insertion holes 57 (permanent magnets 53) in the rotor 10 (50) is two, even though each magnet insertion hole 57 (permanent magnet 53) are arranged to the upper part and the lower part respectively in the rotor 10 (50) or the left part and the right part respectively in the rotor 10 (50), it is represented that the magnet insertion holes 57 (permanent magnets 53) are arranged (formed) at intervals in the circumferential direction.

Hereinafter, the rotor 10 of the synchronous motor according to the first embodiment will be described in detail with reference to FIG. 1. In general, since a cross section of the rotor 10 which is perpendicular to a rotation axis is uniform in a rotation axis direction, the shapes of the magnetic path, the slit, the permanent magnet, and the magnet insertion hole on the cross section perpendicular to the rotation axis will be described.

The rotor core 11 of the rotor 10 is formed by stacking plate members made of soft magnetic materials such as silicon steel plates in the rotational axis direction. The rotor core 11 includes a plurality of slits 12 formed on an outer peripheral side of the magnet insertion holes 17. The plurality of slits 12 includes an adjusting slit 12c, and magnetic-path forming slits 12a and 12b formed at intervals in a direction (an intersecting direction) intersecting the orientation (radial direction) of the magnetic pole of the permanent magnet 13. In FIG. 1, the intersecting direction is a direction (left-right direction of FIG. 1) along a side of the permanent magnet 13, and hereinafter, the direction along the side of the permanent magnet 13 is appropriately referred to as a "first direction". At least one of the magnetic-path forming slits 12a and 12b is an adjusted slit. In FIG. 1, the magnetic-path forming slit 12b present so as to be close to a center of the magnetic pole of the permanent magnet 13 is the adjusted slit. Magnetic paths 14 are formed between the magnetic-path forming slits 12a and 12b and at portions on the outside of the magnetic-path forming slits 12a present on the outermost side in the first direction.

A stator (not illustrated) is disposed on the outside of the rotor 10 in the radial direction. The stator has a substantially cylindrical shape, and a plurality of pole teeth are arranged on a cylindrical inner peripheral surface along the circumferential direction. Spaces between the pole teeth are called slots. A winding is wound around the pole teeth while passing through the slots, and thus, a magnetic pole is formed.

As illustrated in FIG. 1, the adjusted slit 12b and the adjusting slit 12c constitute a slit group 16. The maximum width of the adjusting slit 12c in the first direction is larger than the maximum width of the adjusted slit 12b in the first direction. The rotor 10 of the synchronous motor according to the first embodiment has a feature that the adjusting slit 12c is formed between the adjusted slit 12b and the permanent magnet 13 such that a difference between quantities of magnetic flux passing through magnetic paths 14a and 14b adjacent to each other for the widths in the first direction is small.

In FIG. 1, the widths of the magnetic path 14a and the magnetic path 14b (widths in the first direction) are set so as to be equal for the sake of convenience in description. In FIG. 1, the widths of the adjusted slit 12b and the adjusting slit 12c are determined by a relationship expressed by Equation (1) such that the quantity of magnetic flux which passes through the magnetic path 14a and flows to the stator and the quantity of magnetic flux which passes through the magnetic path 14b and flows to the stator are equal.

$$(W2-W1)/W2=W4/W3 \quad (1)$$

In FIG. 1, W1, W2, W3, and W4 in Equation (1) are illustrated. In Equation (1), W1 is the shortest distance between an outer peripheral end of the rotor core 11 and an edge of the magnet insertion hole 17 on a side (right side in FIG. 1) of one end of the permanent magnet 13 in the first direction. W2 is a distance in the first direction and is a distance from the one end (right end in FIG. 1) of the permanent magnet 13 to an edge of the magnetic-path forming slit 12a closest to the one end on the side of the one end. W3 is a distance in the first direction and is a distance from an edge of the adjusted slit 12b on the side (right side in FIG. 1) of the one end to an edge of the magnetic-path forming slit 12a adjacent to the adjusted slit 12b on the side of the one end, which is close to the adjusted slit 12b. W4 is a distance in the first direction and is a distance from an edge of the adjusting slit 12c on the side (right side in FIG. 1) of the one end to an edge of the magnetic-path forming slit 12a adjacent to the adjusting slit 12c on the side of the one end, which is close to the adjusting slit 12c.

A flow of magnetic flux lines generated from the permanent magnet 13 in this structure will be described with reference to FIG. 1. In FIG. 1, the permanent magnet 13 is magnetized in an outward orientation in the radial direction, and magnetic flux lines 15 indicate paths of the magnetic flux lines generated from the permanent magnet 13. The number of magnetic flux lines 15 indicating the paths of the magnetic flux lines indicates a relative quantity of magnetic flux. As described above, since the widths of the magnetic path 14a and the magnetic path 14b are equal, the same number of magnetic flux lines basically flow to all the magnetic paths from the permanent magnet 13. However, the adjusting slit 12c having the wide width in the first direction is disposed, and thus, the magnetic flux lines flowing to the magnetic path 14b are restricted. Three magnetic flux lines flow to the magnetic path 14a, and two magnetic flux lines flow to the magnetic path 14b. When attention is paid to the quantities of magnetic flux which passes through the magnetic paths 14 from the permanent magnet 13 and flow to the stator, since two flowed magnetic flux lines flow to the stator as they are at the magnetic path 14b and one magnetic flux line leaks to a connection portion between the magnetic poles at the magnetic path 14a, two magnetic flux lines of the three flowed magnetic flux lines flow to the stator.

Figure 6:
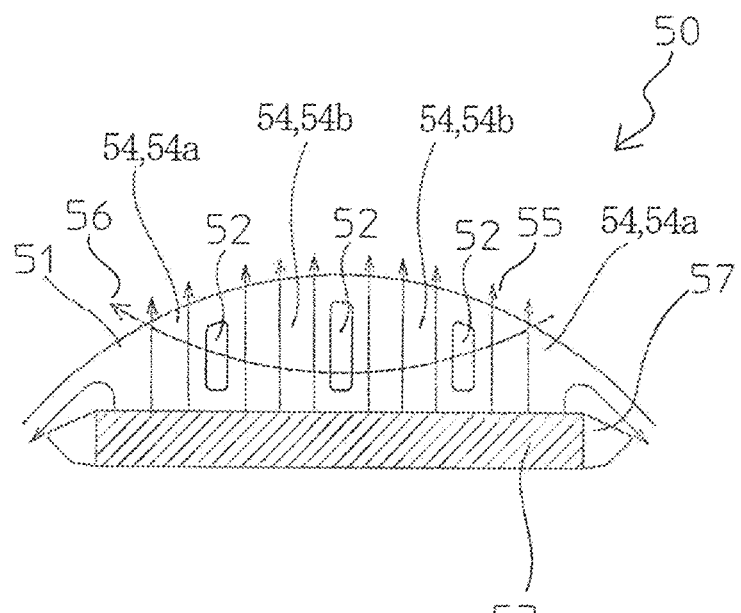
FIG. 6 is a partial enlarged view of the rotor of FIG. 5 and illustrates magnetic flux lines generated from a permanent magnet.

As stated above, the quantities of magnetic flux which pass through the magnetic paths 14 and flow to the stator are equal at the magnetic path 14a and the magnetic path 14b due to the effect of the adjusting slit 12c, unlike FIG. 6 illustrating a flow of magnetic flux lines in the rotor of the IPM of the prior art. Accordingly, since magnetic attraction forces generated at all the magnetic paths are equal and the magnetic attraction forces do not fluctuate when the rotor 10 rotates, it is possible to reduce cogging torque.

Although in the first embodiment described above, three magnetic-path forming slits 12a and 12b are arranged for one pole, the number of magnetic-path forming slits 12a and 12b arranged for one pole is not limited to three. A plurality of magnetic-path forming slits 12a and 12b may be separately provided along the orientation (up-down direction of FIG. 1) of the magnetic pole. A plurality of adjusting slits 12c may be separately provided along the orientation (up-down direction of FIG. 1) of the magnetic poles.

Although in the first embodiment described above, the widths of the magnetic path 14a and the magnetic path 14b are equal, the present disclosure is not limited thereto.

In the first embodiment described above, the widths of the magnetic-path forming slits 12a and 12b and the adjusting slit 12c are determined by Equation (1) such that the quantity of magnetic flux which passes through the magnetic path 14a and flows to the stator and the quantity of magnetic flux which passes through the magnetic path 14b and flows to the stator are equal. However, the present disclosure is not limited to this example. When the adjusting slit 12c having the wide width in the first direction is present irrespective of the relationship of Equation (1), it is possible to reduce a difference between the quantity of magnetic flux which passes through the magnetic path 14a and flows to the stator and the quantity of magnetic flux which passes through the magnetic path 14b and flows to the stator, and it is possible to reduce the cogging torque.

The adjusting slit 12c may be connected to the magnet insertion hole 17. Even in this case, it is possible to obtain the same effect as that described above.

In the first embodiment described above, the slit group 16 (the adjusted slit 12b and the adjusting slit 12c) are present so as to be close to the center of the magnetic pole of the permanent magnet 13. However, the position of the slit group 16 is not limited as long as it is possible to reduce a change in magnetic flux of the magnetic paths 14a and 14b adjacent to each other. For example, the adjusting slit 12c may be disposed between each of the magnetic-path forming slits 12a (adjusted slits) and the permanent magnet 13 by using, as the adjusted slits, two magnetic-path forming slits 12a present on both sides of the magnetic-path forming slit 12b present so as to be close to the center of the magnetic pole of the permanent magnet 13. This configuration is a configuration of a case where each of two deformation slits 18 is divided into upper and lower slits and the upper and lower slits are used as the adjusted slit and the adjusting slit in FIG. 4 (a modification example of the second embodiment) to be described below.

Second Embodiment

Figure 2:
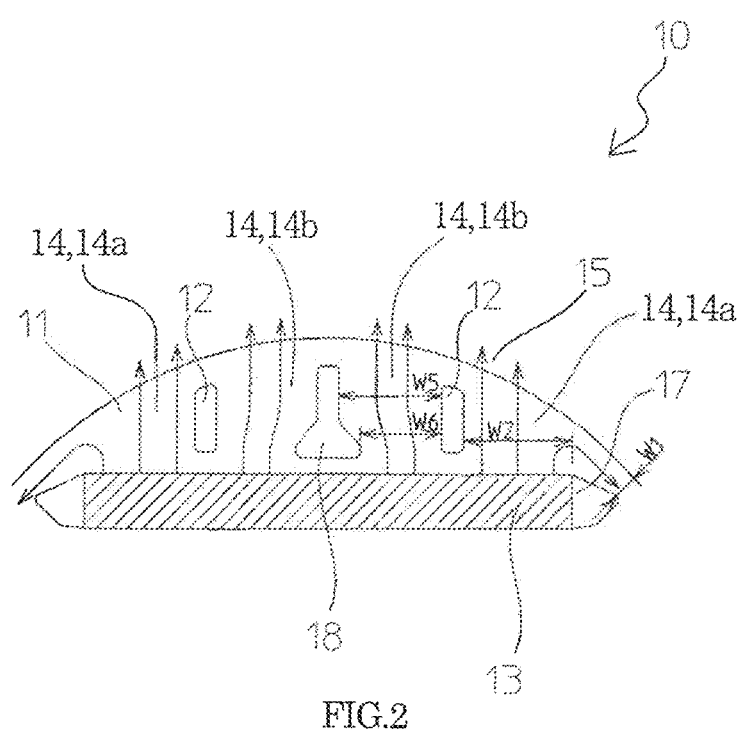
FIG. 2 is a partial enlarged view of a cross section of a rotor according to a second embodiment.

Next, a rotor 10 of a synchronous motor according to a second embodiment will be described. FIG. 2 is a partial enlarged view of a cross section of the rotor 10 of the synchronous motor according to the second embodiment. In the second embodiment, a deformation slit 18 is formed by forming, as one slit, the adjusted slit 12b and the adjusting slit 12c according to the first embodiment. Since the other configuration is the same as that of the first embodiment, the common configuration will be appropriately omitted.

As illustrated in FIG. 2, the plurality of slits 12 and 18 are formed at intervals in a direction (an intersecting direction) intersecting the orientation (radial direction) of the magnetic pole of the permanent magnet 13. Similarly to the first embodiment, the intersecting direction is the direction (left-right direction, first direction) along the side of the permanent magnet 13 in the second embodiment. The magnetic paths 14 are formed between the slits 12 and 18 and at the portions on the outside of the slits 12 on the outermost side in the first direction. The rotor 10 of the synchronous motor according to the second embodiment has a feature that two or more kinds of slits 12 and 18 whose maximum widths in the first direction are different are formed such that a difference between the quantities of magnetic flux passing through the magnetic paths 14 adjacent to each other for the widths in the first direction is small.

At least one of the slits 12 and 18 is the deformation slit 18 which extends toward an outer peripheral side of the rotor core 11 from a side of the permanent magnet 13 and has a shape in which a width in the first direction changes midway. In FIG. 2, a width of an end portion of the deformation slit 18 in the first direction on the side of the permanent magnet 13 is larger than a width of an end portion of the deformation slit 18 in the first direction on the outer peripheral side of the rotor core.

In FIG. 2, the widths of the magnetic path 14a and the magnetic path 14b (the widths in the first direction) are set so as to be equal. In FIG. 2, the widths of the slits 12 and 18 are determined by the relationship expressed by Equation (2) such that the quantity of magnetic flux which passes through the magnetic path 14a and flows to the stator and the quantity of magnetic flux which passes through the magnetic path 14b and flows to the stator are equal.

$$(W2-W1)/W2 = W6/W5 \quad (2)$$

In FIG. 2, W1, W2, W5, and W6 in Equation (2) are illustrated. Hereinafter, the end portion of the deformation slit 18 on the side of the permanent magnet 13 is referred to as an "expansion portion", and a portion between the end portion of the deformation slit 18 on the side of the permanent magnet 13 and the end portion thereof on the outer peripheral side of the rotor core 11 is referred to as an "intermediate portion". In Equation (2), W1 is the shortest distance between an outer peripheral end of the rotor core 11 and an edge of the magnet insertion hole 17 on a side (right side of FIG. 2) of one end of the permanent magnet 13 in the first direction. W2 is a distance in the first direction and is distance from the one end (right end of FIG. 2) of the permanent magnet 13 to an edge of the slit 12 closest to the one end on the side of the one end. W5 is a distance in the first direction and is a distance from an edge of the intermediate portion of the deformation slit 18 on the side (right side of FIG. 1) of the one end to an edge of the slit 12 adjacent to the deformation slit 18 on the side of the one end, which is close to the deformation slit 18. W6 is a distance in the first direction and is a distance from an edge of the expansion portion of the deformation slit 18 on the side (right side of FIG. 1) of the one end to an edge of the slit 12 adjacent to the deformation slit 18 on the side of the one end, which is close to the deformation slit 18.

A flow of magnetic flux lines generated from the permanent magnet 13 in this structure will be described with reference to FIG. 2. In FIG. 2, the permanent magnet 13 is magnetized in an outward orientation in the radial direction, and magnetic flux lines 15 indicate paths of the magnetic flux lines generated from the permanent magnet 13. The number of magnetic flux lines 15 indicating the paths of the magnetic flux lines indicates a relative quantity of magnetic flux. As described above, since the widths of the magnetic path 14a and the magnetic path 14b are equal, the same number of magnetic flux lines basically flow to all the magnetic paths from the permanent magnet 13. However, the maximum width of the deformation slit 18 in the first direction (left-right direction of FIG. 2), which is disposed so as to be close to the center of the magnetic pole is larger than the maximum width of another slit 12 in the first direction, and thus, the magnetic flux lines flowing to the magnetic path 14b are restricted. Three magnetic flux lines flow to the magnetic path 14a, and two magnetic flux lines flow to the magnetic path 14b. In this case, when attention is paid to the quantity of magnetic flux which passes through the magnetic paths 14 from the permanent magnet 13 and flows to the stator, since two flowed magnetic flux lines flow to the stator as they are at the magnetic path 14b and one magnetic flux line leaks to a connection portion between the magnetic poles at the magnetic path 14a, two magnetic flux lines of the three flowed magnetic flux lines flow to the stator.

As stated above, the quantities of magnetic flux passing through the magnetic paths 14 are equal due to the effect of the deformation slit 18, unlike FIG. 6 illustrating the flow of the magnetic flux lines in the rotor of the IPM of the prior art. Accordingly, similarly to the first embodiment, since the magnetic attraction forces generated at all the magnetic paths 14 are equal and the magnetic attraction forces do not fluctuate when the rotor 10 rotates, it is possible to reduce the cogging torque.

Similarly to the first embodiment, although in the second embodiment described above, three slits 12 and 18 are arranged for one pole, the number of slits 12 and 18 arranged for one pole is not limited to three. A plurality of slits 12 and 18 may be separately present along the orientation (up-down direction FIG. 2) of the magnetic pole.

Similarly to the first embodiment, although in the second embodiment described above, the widths of the magnetic path 14a and the magnetic path 14b are equal, the present disclosure is not limited thereto.

In the second embodiment described above, the widths of the slits 12 and 18 are determined by Equation (2) such that the quantity of magnetic flux which passes through the magnetic path 14a and flows to the stator and the quantity of magnetic flux which passes through the magnetic path 14b and flows to the stator are equal. However, the present disclosure is not limited to this example. When the two or more kinds of slits 12 and 18 whose maximum widths are different are formed irrespective of the relationship of Equation (2), it is possible to reduce a difference between the quantity of magnetic flux which passes through the magnetic path 14a and flows to the stator and the quantity of magnetic flux which passes through the magnetic path 14b and flows to the stator, and it is possible to reduce the cogging torque.

The deformation slit 18 may be connected to the magnet insertion hole 17. Even in this case, it is possible to obtain the same effect as that described above.

Figure 3:
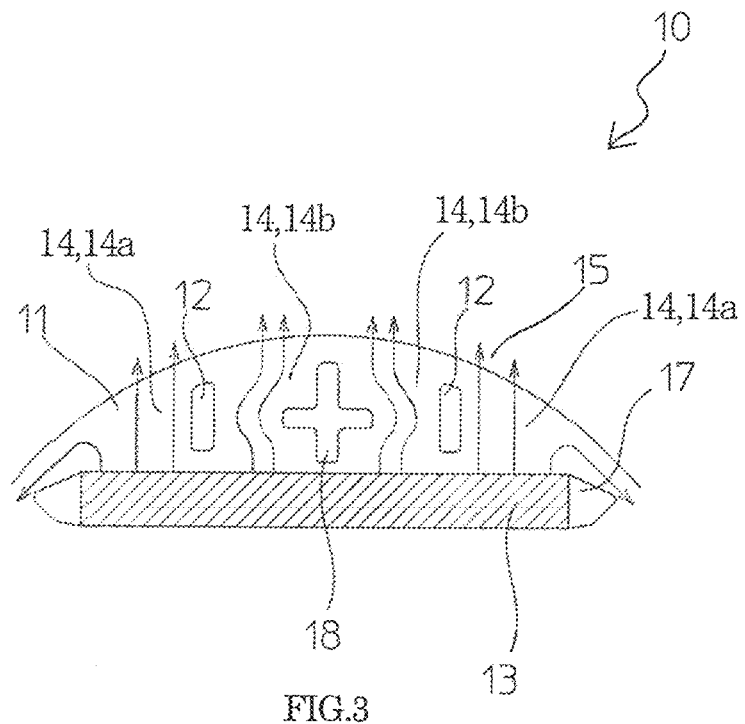
FIG. 3 is a partial enlarged view of a cross section of a rotor according to a modification example of the second embodiment.

In the second embodiment described above, a portion at which the width of the deformation slit 18 in the first direction is largest (a portion at which the width is maximized) is the end portion on the side of the permanent magnet 13. However, the portion at which the width is maximized may be another portion of the deformation slit 18. FIG. 3 is a partial enlarged view of a cross section of a rotor according to a modification example of the second embodiment. As illustrated in FIG. 3, the portion at which the width is maximized may be present near a substantially middle of the deformation slit 18 in the direction (up-down direction of FIG. 2) along the orientation of the magnetic pole. Even in this case, it is possible to obtain the same effect as that described above.

Figure 4:
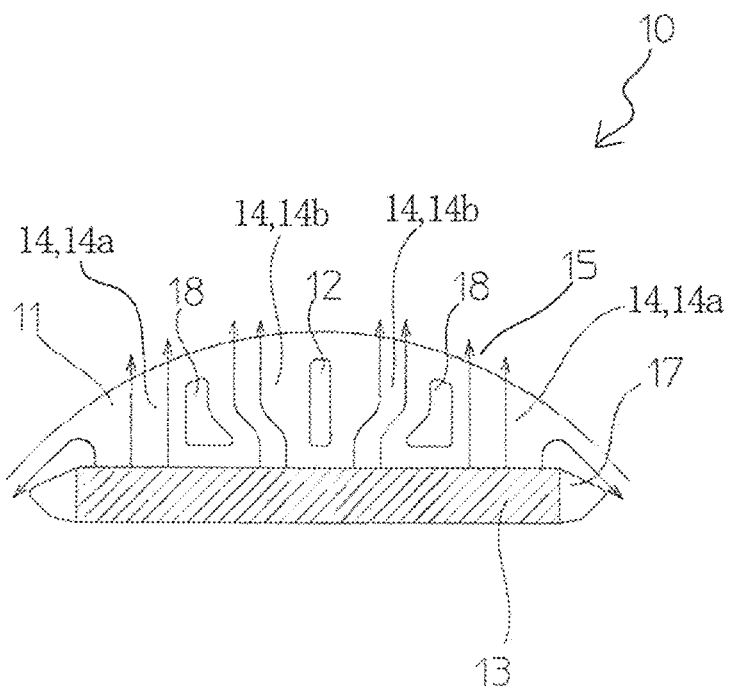
FIG. 4 is a partial enlarged view of a cross section of a rotor according to another modification example of the second embodiment.

In the second embodiment described above, the deformation slit 18 is present so as to be close to the center of the magnetic pole of the permanent magnet 13. However, the position of the deformation slit 18 is not limited as long as it is possible to reduce the difference between the quantities of magnetic flux passing through the magnetic paths 14a and 14b adjacent to each other for the widths in the first direction. FIG. 4 is a partial enlarged view of a cross section of a rotor according to another modification example of the second embodiment. As illustrated in FIG. 4, two slits present on both the sides of the slit 12 present so as to be close to the center of the magnetic pole of the permanent magnet 13 may be used as the deformation slits 18. Even in this case, it is possible to obtain the same effect as that described above.

Figure 7:
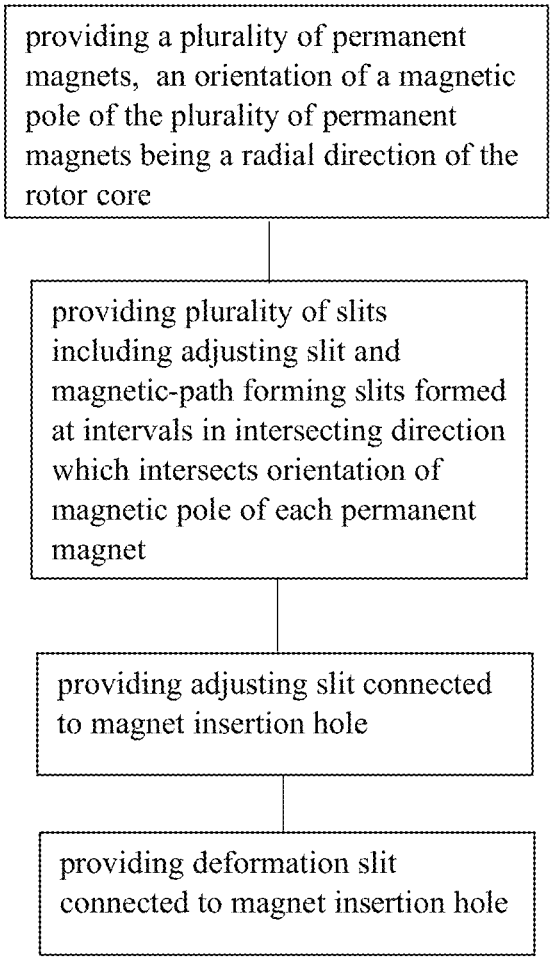
FIG. 7 is a diagram illustrating a rotor according to an embodiment.

FIG. 7 is a diagram illustrating a rotor according to an embodiment. Specifically, referring to FIG. 7, a plurality of permanent magnets may be provided such that an orientation of a magnetic pole of the plurality of permanent magnets is a radial direction of the rotor core, a plurality of slits may be provided such that the plurality of slits includes an adjusting slit and magnetic-path forming slits formed at intervals in an intersecting direction which intersects the orientation of the magnetic pole of each permanent, an adjusting slit may be provided to be connected to a magnet insertion hole, and a deformation slit may be provided to be connected to the magnet insertion hole.

The invention claimed is:

1. A rotor of a synchronous motor comprising:
a rotor core that is formed from a silicon steel plate or a soft magnetic material, the rotor core including a plurality of magnet insertion holes formed at intervals in a circumferential direction and a plurality of slits formed on an outer peripheral side of the magnet insertion holes; and
a plurality of permanent magnets which are embedded in the magnet insertion holes, respectively, an orientation of a magnetic pole of the plurality of permanent magnets being a radial direction of the rotor core,
wherein the plurality of slits include an adjusting slit and magnetic-path forming slits formed at intervals in an intersecting direction which intersects the orientation of the magnetic pole of each permanent magnet,
at least one of the magnetic-path forming slits is an adjusted slit,
magnetic paths are formed between the magnetic-path forming slits and formed at portions on an outside of the magnetic-path forming slits on an outermost side in the intersecting direction, and
the adjusting slit is formed between the adjusted slit and the permanent magnet.

2. The rotor of a synchronous motor according to claim 1, wherein a maximum width of the adjusting slit in the intersecting direction is larger than a maximum width of the adjusted slit in the intersecting direction.

3. The rotor of a synchronous motor according to claim 1, wherein the adjusting slit is connected to the magnet insertion hole.

4. The rotor of a synchronous motor according to claim 1, wherein the adjusted slit is the magnetic-path forming slit which is adjacent to a center of the magnetic pole of the permanent magnet.

5. The rotor of a synchronous motor according to claim 4, wherein the intersecting direction is a first direction along a side of the permanent magnet, and
W1 which is a shortest distance between an outer peripheral end of the rotor core and an edge of the magnet insertion hole on a side of one end of the permanent magnet in the first direction, W2 which is a distance in the first direction and is a distance from the one end of the permanent magnet to an edge of the magnetic-path forming slit closest to the one end on the side of the one end, W3 which is a distance in the first direction and is a distance from an edge of the adjusted slit on the side of the one end to an edge of the magnetic-path forming slit adjacent to the adjusted slit on the side of the one end, which is adjacent to the adjusted slit, and W4 which is a distance in the first direction and is a distance from an edge of the adjusting slit on the side of the one end to an edge of the magnetic-path forming slit adjacent to the adjusting slit on the side of the one end, which is a adjacent to the adjusting slit, satisfy a relationship of Equation (1).

$$(W2-W1)/W2=W4/W3 \tag{1}$$

6. The rotor of a synchronous motor according to claim 1, wherein the magnetic-path forming slits present on both sides of the magnetic-path forming slit adjacent to the center of the magnetic pole of the permanent magnet are used as the adjusted slit.

7. A rotor of a synchronous motor comprising:
a rotor core that is formed by using a silicon steel plate or a soft magnetic material, the rotor core including a plurality of magnet insertion holes formed at intervals in a circumferential direction and a plurality of slits formed on an outer peripheral side of the magnet insertion holes; and
a plurality of permanent magnets which are embedded in the magnet insertion holes, respectively, orientation of a magnetic pole of the plurality of permanent magnets being a radial direction of the rotor core,
wherein the plurality of slits are formed at intervals in an intersecting direction which intersects the orientation of the magnetic pole of each permanent magnet,
magnetic paths are formed between the slits and at portions on an outside of the slits on an outermost side in the intersecting direction, and
two or more of slits which have different maximum widths in the intersecting direction are formed.

8. The rotor of a synchronous motor according to claim 7, wherein at least one of the slits is a deformation slit which extends from a side of the permanent magnet toward an outer peripheral side of the rotor core, and has a shape in which a width in the intersecting direction changes.

9. The rotor of a synchronous motor according to claim 8, wherein a width of an end portion of the deformation slit in the intersecting direction on the side of the permanent magnet is larger than a width of an end portion of the deformation slit on the outer peripheral side of the rotor core in the intersecting direction.

10. The rotor of a synchronous motor according to claim 8, wherein the deformation slit is connected to the magnet insertion hole.

11. The rotor of a synchronous motor according to claim 8, wherein the deformation slit is the slit which is adjacent to a center of the magnetic pole of the permanent magnet.

12. The rotor of a synchronous motor according to claim 11, wherein the intersecting direction is a first direction along a side of the permanent magnet,
an end portion of the deformation slit on the side of the permanent magnet is an expansion portion,
a portion between the end portion of the deformation slit on the side of the permanent magnet and the end portion on the outer peripheral side of the rotor core is an intermediate portion, and
W1 which is a shortest distance between an outer peripheral end of the rotor core and an edge of the magnet insertion hole on a side of one end of the permanent magnet in the first direction, W2 which is a distance in the first direction and is a distance from the one end of the permanent magnet to an edge of the slit closest to the one end on the side of the one end, W5 which is a distance in the first direction and is a distance from an edge of the intermediate portion of the deformation slit on the side of the one end to an edge of the slit adjacent to the deformation slit on the side of the one end, which is adjacent to the deformation slit, and W6 which is a distance in the first direction and is a distance from an edge of the expansion portion of the deformation slit on the side of the one end to an edge of the slit adjacent to the deformation slit on the side of the one end, which is adjacent to the deformation slit, satisfy a relationship of Equation (2).

$$(W2-W1)/W2 = W6/W5 \qquad (2)$$

13. The rotor of a synchronous motor according to claim 8, wherein the slits present on both sides of the slit which is adjacent to the center of the magnetic pole of the permanent magnet and are used as the deformation slit.

\* \* \* \* \*